Feb. 20, 1945. B. F. W. HEYER ET AL 2,369,826
FAST CHARGER
Filed Aug. 5, 1942 4 Sheets-Sheet 4

Inventors
BENJAMIN F. W. HEYER,
CLARENCE W. DALZELL
AND JOHN W. HORTON
By Semmes, Keegin Beale & Semmes
Attorneys Patented Feb. 20, 1945

2,369,826

UNITED STATES PATENT OFFICE 2,369,826

FAST CHARGER

Benjamin F. W. Heyer, Tenafly, Clarence W. Dalzell, West Caldwell, and John W. Horton, East Orange, N. J.

Application August 5, 1942, Serial No. 453,712

11 Claims. (Cl. 320—20)

This invention relates to battery charging apparatus and more particularly has reference to apparatus for charging batteries at a high rate and the control of such apparatus.

In charging batteries by the so-called "fast charge" method, a current of from 80 to 100 amperes is passed through the same. When using such a high current it is important that it be immediately discontinued when the temperature of the battery has reached a value above which damage will occur. The control of the charging of the batteries may be effected by means of a thermostat having a bulb immersed in the electrolyte of the battery. In many instances by the time the battery has reached the temperature above which damage will be caused, the battery will be adequately charged and unless some means other than the mere thermostatic control is provided after the battery has cooled sufficiently to enable the thermostatic switch to re-close, the charging will start all over again. This will result in a waste of current and will not serve any useful purpose.

Moreover, when charging batteries at such a high rate, any short circuit will cause considerable damage to the charging equipment unless some protective devices are used.

An object of this invention is to provide a control mechanism for battery charging apparatus.

Another object of this invention is to provide a battery charger in which a contactor is provided in the alternating current circuit and is controlled by an actuator energized by the battery to be charged.

A further object of this invention is to provide a battery charger in which a contactor is provided in the alternating current circuit and is adapted to be closed by an actuator energized by the battery under charge and which is controlled by a thermostatic switch responsive to the temperature of the battery.

Still another object of this invention is to provide a battery charger having a contactor in the alternating current circuit thereof, a control circuit energized by the battery under charge, and means in said control circuit for closing said contactor and means responsive to an overload on the charger for opening said contactor.

A still further object of this invention is to provide an indicator associated with the thermostatic control circuit of a battery charger to indicate the position of the thermostatically actuated switch.

An additional object of this invention is to provide a battery charger having a contactor in the alternating current circuit thereof, a control circuit including means energized by the battery for actuating the contactor, and signal means for indicating whether the contactor is open or closed.

This invention has as another object the provision in a battery charger of a contactor in the alternating current circuit, means actuated by the battery for closing said contactor, and means for closing the circuit normally closed by the contactor when the battery is dead.

It is also an object of this invention to provide a resistance in series with the primary winding of the transformer of a fast charger to enable a slow charge to be made.

Yet another object of this invention is to provide cooling means for reducing the temperature of the rectifier to enable a rectifier of small size to be used for charging batteries at a high rate.

With these and other objects in view which will appear more fully hereinafter, the invention resides in the apparatus and circuits illustrated in the drawings and set forth in the accompanying specification.

Figure 1:
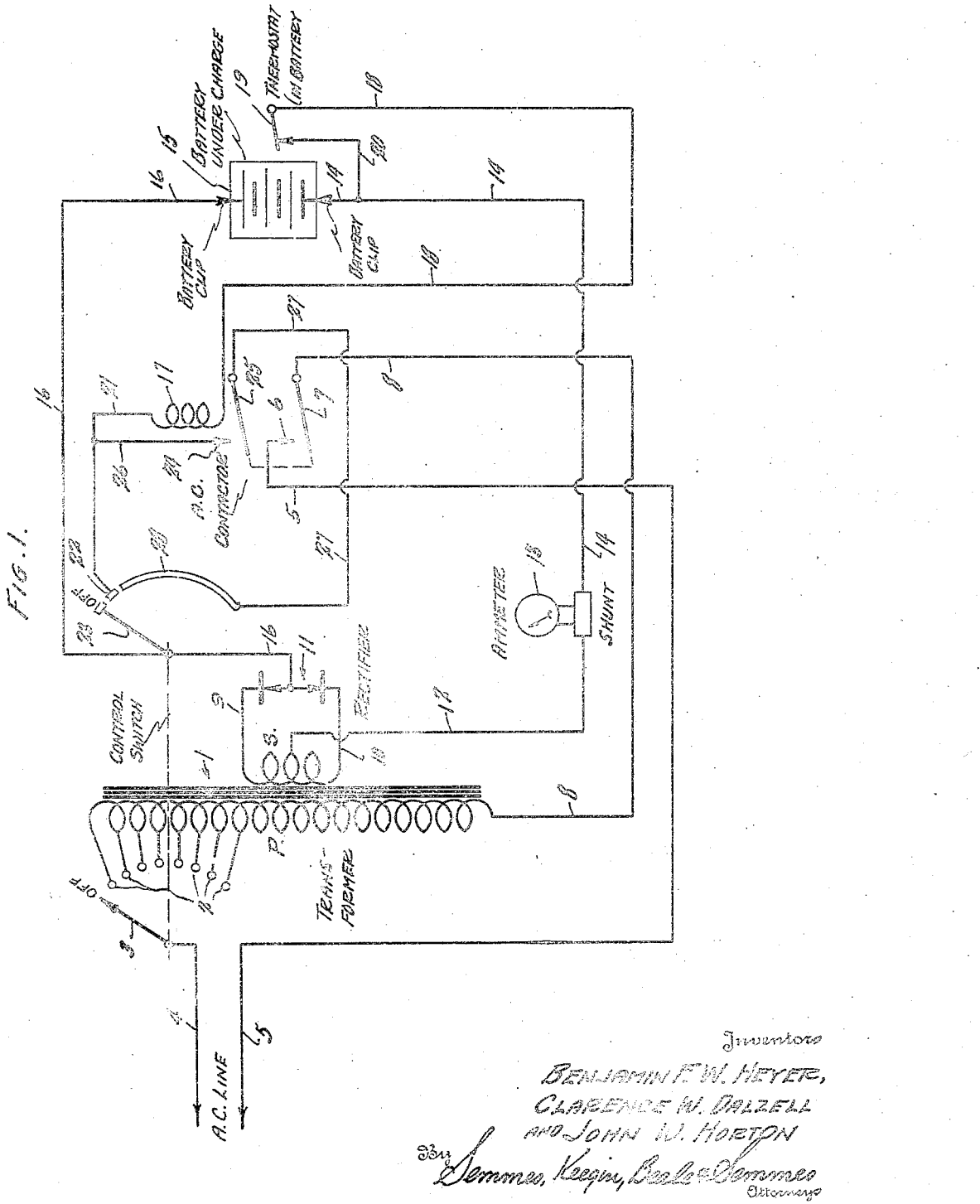
Figure 1 is a schematic view of the circuit of a fast charger embodying the concepts of the present invention.

In Figure 1 of the drawings there is shown a schematic diagram of a circuit embodying the principles of the present invention. As illustrated, the charger circuit includes a transformer 1 having a core, a primary winding P and a secondary winding S. The primary winding P is tapped at a plurality of points adjacent one end thereof and the leads from the taps are connected to contact points 2 of a control switch which has a selector arm 3. One wire 4 of an A. C. line is connected to the switch arm 3 and the other wire 5 is conected to one terminal 6 of an A. C. contactor. A conductor 8 extends from the movable element 7 of the A. C. contactor to the non-tapped end of the primary winding P of the transformer.

Thus, by means of the control switch 2, 3 and the A. C. contactor 6, 7, the primary of the transformer may be connected to, or disconnected from, the A. C. line. With this arrangement the primary circuit is controlled by the switch 2, 3 and the A. C. contactor 6, 7.

As illustrated, the secondary windings S of the transformer has its terminals connected by conductors 9 and 10 to the terminals of the full wave rectifier 11. From the mid-point of the secondary winding S a conductor 12 extends to an ammeter 13 and from the latter conductor 14 extends and is connected by a suitable connector to one terminal of a battery 15 to be charged.

The cathode of the rectifier is connected by conductor 16 to the other terminal of battery 15 by a suitable connector.

Charging of a battery may be effected with apparatus connected as described, but for fast charging of batteries with currents as high as 100 amperes it is necessary to provide for accurate control of the apparatus to obtain efficient charging without damage to the battery or charging equipment.

For this purpose the present invention provides a control circuit associated with the charging apparatus. In this connection it will be noted that the A. C. contactor includes an actuator for the movable element 7 which is provided with a winding 17. Winding 17 is connected by a conductor 18 to one terminal of a thermostatic switch 19, the temperature responsive element of which is adapted to be placed in the electrolyte of the battery so that the thermostatic switch will open when the temperature of the battery exceeds a predetermined value. The other terminal of the thermostatic switch is connected by a conductor 20 to the conductor 14 which in turn is connected to one terminal of the battery 15. The other end of the winding 17 of the A. C. contactor is connected by a conductor 21 to a contact point 22 of a selector switch which has its selector arm 23 mounted on a shaft common to the arm 3 of the control switch. Arm 23 is insulated from the arm 3 of the control switch but has electrical contact with the conductor 16 so that when the arm 23 is in a position to engage contact 22 an electrical circuit will be established from one terminal of the battery 15 through conductors 14 and 20 to and through the thermostatic switch 19, thence through conductor 18 to winding 17 and from winding 17 through conductor 21, contact point 22, switch arm 23 and through conductor 16 to the other terminal of battery 15.

When the above described control circuit is completed by closure of thermostatic switch 19 and by engagement of the arm 23 with contact point 22, current from the battery 15 will flow through the winding 17 of the A. C. contactor and serve to close contacts 6 and 7.

Since the arm 3 of the tap selector switch and the arm 23 of the control circuit selector switch are mounted on a common shaft for simultaneous movement, it will be appreciated that by moving the arm 3 into engagement with the contact 2 of the first tap of the primary of the transformer, simultaneous engagement will be effected by the arm 23 with contact 22. The battery being at a fairly low temperature, the thermostatic switch 19 will be closed and current from the battery will serve to close the A. C. contactor 6, 7. Thus, the primary circuit of the transformer will be completed and the charger will come into operation.

With the control circuit described, charging of the battery will proceed until the temperature thereof exceeds a predetermined value and at this point the thermostatic switch 19 will open, causing the current flowing through the winding 17 to stop. Upon failure of current to flow through the winding 17, the A. C. contactor will open either by gravity or under spring action and thus charging of the battery will be terminated immediately. If no other control were provided after the battery had cooled to a value below that at which the thermostatic switch would close, charging would start again.

In many instances when charging at the high rate employed in fast chargers, by the time the battery has reached a temperature sufficient to cause the thermostatic switch to open, an adequate charge of the battery will be introduced therein and further charging of the battery would be unnecessary and involve a waste of energy. To overcome this disadvantage, the present invention embodies a lockout arrangement so that when the thermostatic switch has opened and current has ceased to flow through the winding 17, the circuit containing winding 17 will be broken independently of the connection between arm 23 and contact 22 and independently of the thermostatic switch. For this purpose, a contactor having a fixed contact 24 and a movable element 25 is provided. The movable element is tied to the movable element 7 of the A. C. contactor and is adapted to be actuated therewith by means of the actuator which is energized by the winding 17. Fixed contact 24 is connected by a conductor 26 to a conductor 21 and the movable element 25 is connected by conductor 27 to an elongated arcuate contact 28 with which the arm 23 of the selector switch is to engage.

Contacts 22 and 28 are close enough together so that the wiper element on the end of switch 23, in being moved from the contact 22 to contact 28, will maintain engagement with contact 22 until after it has engaged contact 28. It is important, however, that the extent of contact 22 and the spacing between the two contacs be sufficient that the arm 23 may be engaged with contact 22 without touching contact 28.

In starting a charger having circuits as described in connection with Figure 1, the control switch is first moved to a position in which switch arm 3 will engage the first tap contact 2 and switch arm 23 will engage the contact 22. With the control switch in this position and the battery clips connected to the terminals of the battery to be charged, a current will be caused to flow through the control circuit as hereinbefore described and will cause the winding 17 to become energized which will actuate the A. C. contactor to cause the movable contactor 7 to engage the first contact 6 and likewise will cause the movable contact 25 to engage the fixed contact 24. After closing of the A. C. contactor 6, 7, a charge will begin to flow through the battery. In order to increase the charging current, the control switch is moved from the first tap contact 2 to successive tap contacts which progressively cause the charging current to be increased.

During the movement of the control switch to cause the arm 3 to engage successive tap contacts 2, the connection between arm 23 and contact 22 will be broken, but before the control circuit including the battery, thermostatic switch, and winding 17 is broken, it will be re-established by engagement of arm 23 with the arcuate contact 28. Under these circumstances the current will flow from the battery through conductors 14 and 20 to thermostatic switch 19, from this switch through conductor 18 to winding 17, from winding 17 through conductor 26 to fixed contact 24. From the fixed contact 24 the current will flow to the movable contact 25 and from there through conductor 27 to the arcuate contact 28 which engages the end of arm 23 and from arm 23 to conductor 16 back to the battery.

When the control circuit is completed by engagement of contacts 24 and 25, the battery becomes sufficiently charged to cause the same to heat up to a predetermined temperature which will actuate the thermostatic switch 19, the flow of current from the battery through the control circuit will be stopped, and this will enable the winding 17 to be de-energized which will permit the movable contacts 7 and 25 to be separated from fixed contacts 6 and 24, respectively. Under these circumstances, if after the battery has cooled sufficiently to enable the thermostatic switch 19 to re-close, the control circuit will not be completed by merely closing the thermostatic switch 19 because of the break in the circuit between the contacts 24 and 25. In view of the fact that the switch arm 23 is in engagement with the arcuate contact 28 and away from the contact 22, it will be impossible for battery current to flow through the control circuit and in order to re-start charging, it will be necessary to move the control switch back to a position in which the arm 23 engages contact 22.

It will be realized from the foregoing description that in order for the lockout switch 24, 25 of the control circuit to be effected, it is necessary that the control switch be moved to a position wherein the switch arm 23 is out of engagement with the contact 22. In other words, the switch arm 3 must be moved to a position away from the initial tap contact. If the control switch is left on the initial tap contact and the arm 23 is left in engagement with contact 22, after the battery has been heated sufficiently to actuate the thermostat and has re-cooled, the thermostatic switch will re-close and this in turn will cause the contactor 6, 7 to re-close, causing charging current to again be sent to the battery. However, in order to obtain a fast charge it is necessary to cause a high current to flow through the battery and to accomplish this the control switch must be moved to a position in which the arm 3 is in engagement with one of the tap contacts remote from the end of the primary winding.

Figure 2:
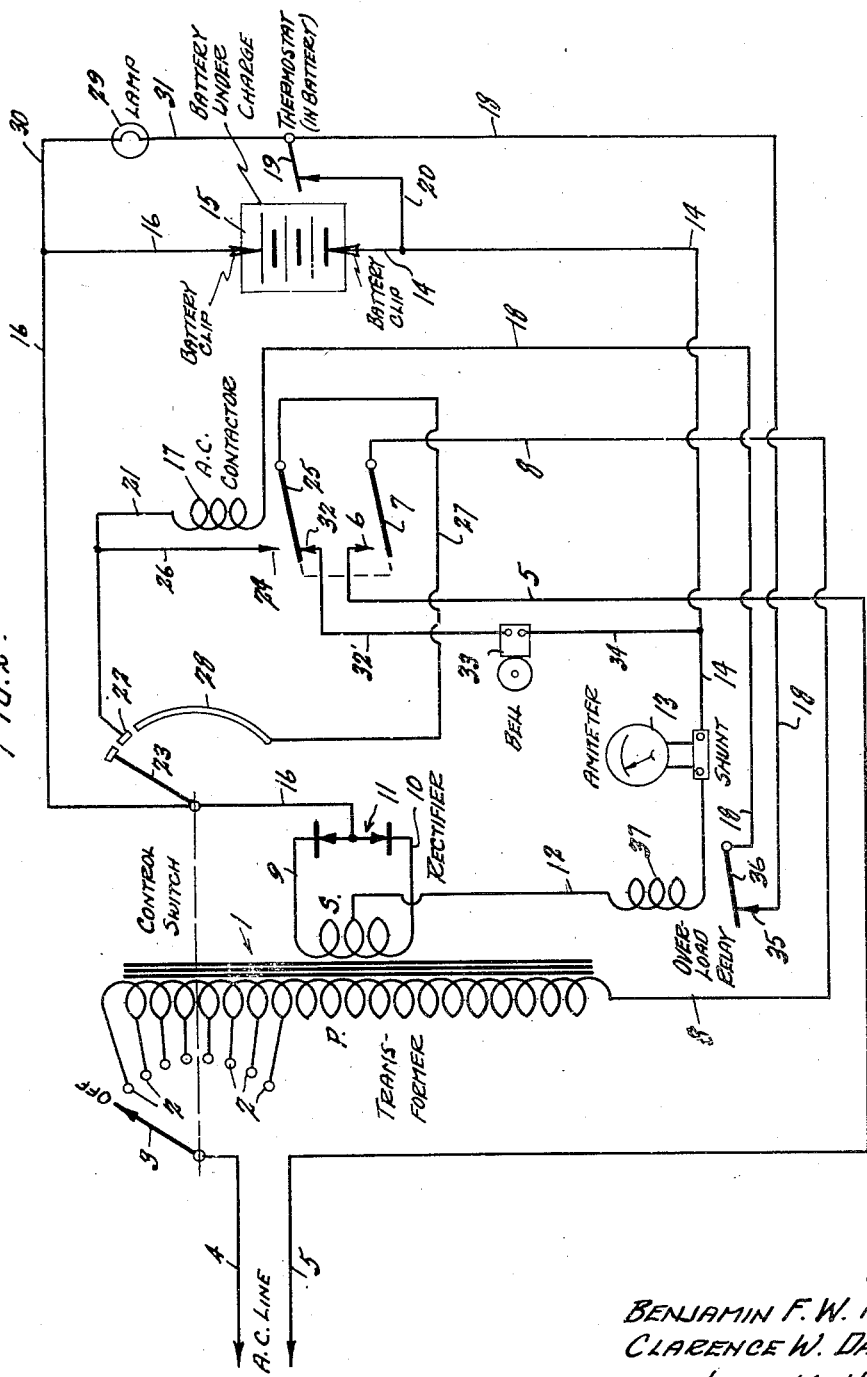
Figure 2 is a view similar to Figure 1 illustrating a modified form of circuit.

In Figure 2 of the drawings, a modified form of circuit has been illustrated which includes indicator means for indicating whether or not the thermostatic switch is open or closed and indicator means to indicate whether or not the lockout switch 24, 25 is open or closed. In addition, the circuit shown in Figure 2 embodies an overload relay which is operative upon excessive current flowing through the battery charging circuit to break the control circuit which in turn will stop the flow of current through the battery.

As illustrated, an indicating device 29 is incorporated in an indicator circuit including the thermostatic switch 19 and the battery 15 under charge. The indicator 29 which may be in the form of a lamp which will be illuminated under the voltage of the battery being charged is connected by a conductor 30 with one of the leads 16 extending between the battery and the rectifier. The other side of the indicator 29 is connected to the terminal of the thermostatic switch 19 which is remote from the conductor 20 which serves to connect the thermostatic switch to the lead 14 which is connected to the terminal of the battery. When the thermostatic switch 19 is closed the circuit between the battery 15 and the indicator 29 will be completed and when the thermostatic switch 19 is open this circuit will be broken.

The signalling device to indicate whether the lockout switch 24, 25 is open or closed includes a fixed contact 32 which is positioned to be engaged by the movable contact 25 when separated from the fixed contact 24. A conductor 32' extends between the fixed contact 32 and an indicating device 33 which may take the form of a bell or lamp. Another conductor connects the other terminal of the indicator device 33 with the conductor 14 which serves to connect the secondary winding with the battery 15.

With the indicator device 33 connected as described and with the control switch in a position whereby the arm 23 is in engagement with the arcuate contact 28, any break in the control circuit such as the opening of the thermostatic switch or any other break which causes the movable contact 25 to be separated from the fixed contact 24 will complete the circuit from conductor 14 through indicating device 33 to the movable contact 24 and thence through conductor 27 to the arcuate contact 28, switch arm 23 and conductor 16 to the other terminal of the battery. This signal will continue to operate until the battery is disconnected from the leads 14 and/or 16, or until the movable contact 25 is moved out of engagement with the fixed contact 32.

During charging of batteries, it frequently happens that a short circuit develops in the battery and this will cause an excessive current to flow through the transformer and charger circuit. Other conditions may occur in which the charger is overloaded. Since the control circuit described will be broken only by opening of the thermostatic switch 19, it is desirable to incorporate an overload relay in the control circuit. For this purpose, a relay having a fixed contact 35 and a movable contact 36 is interposed in the conductor 18 of the control circuit between the thermostatic switch 19 and the winding 17. A winding 37 of the device for opening the contacts 35 and 36 is interposed in the conductor 14 between the rectifier and the ammeter. This winding may be positioned, however, at any point in conductors 14 or 16 of the secondary circuit and as a matter of fact may be located in the primary circuit of the transformer. Winding 37 is so constructed that when the current passing therethrough exceeds a predetermined value, the contacts 35 and 36 will be separated. Upon separation of contacts 35 and 36, the control circuit will be broken and A. C. contactor 6, 7 will open. If the control switch is in the first position in which arm 23 engages contact 22, shutting off the power will enable contacts 35 and 36 to re-close and re-energize the control circuit.

When the control switch is in some position other than the first so that the arm 23 engages contact 28 and the relay contacts 35 and 36 are separated, due to opening of lockout contacts 24 and 25 the control circuit will remain open until the control switch is moved back to first position and arm 23 is engaged with contact 22 to by-pass the lockout switch 24, 25 even though contacts 35 and 36 be re-closed. This is of considerable advantage in that once the overload takes place, the charging current is discontinued at the A. C. source and cannot be re-started except by repeating the starting procedure, that is by moving the control switch back to its first position. If the overload still remains, the charger cannot be started. This feature is of importance and is very desirable in that damage to the apparatus is avoided.

Figure 3:
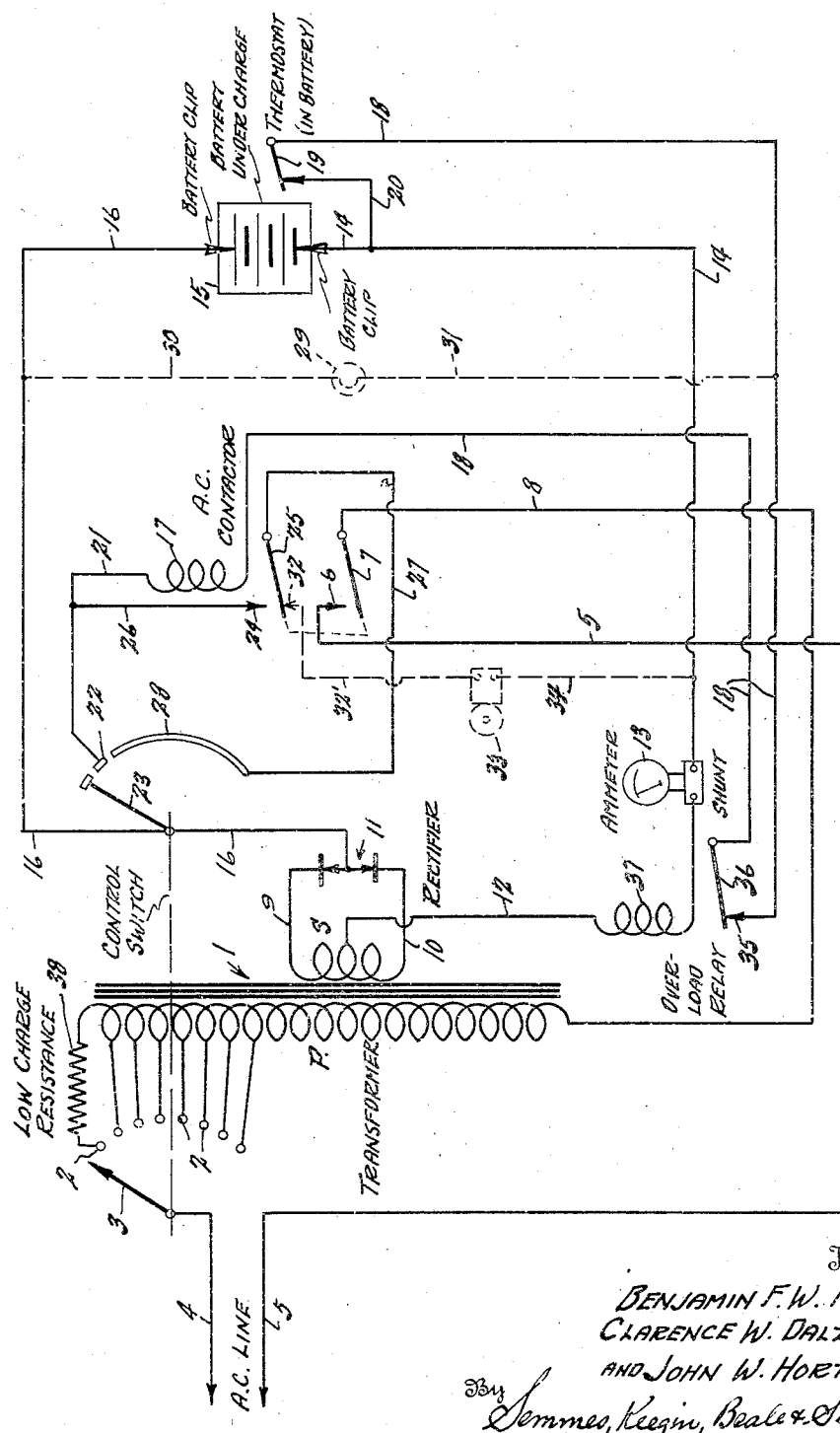
Figure 3 is another view similar to that of Figure 1 illustrating a still further modified form of circuit.

In many instances, particularly in charging new batteries or in finishing the charging of the battery, it is desirable that the charge be sent through the battery at a low rate. For this purpose, the present invention comprehends the provision of means such as a resistance element in series with the primary of the transformer so that the amount of current which will flow through the secondary circuit of the transformer as rectified current will be of the order of about 10 to 15 amperes. As shown in Figure 3 of the drawings, such a resistance which is indicated by reference character 38, is interposed between the first tap contact 2 and the end of the primary winding of the transformer. When the resistance 38 is interposed between the first tap contact and the end of the primary of the transformer this resistance will be placed in series with the primary of the transformer at the same time that the switch arm 23 of the selector switch is in engagement with the first contact point 2. By interposing the resistance in series with the primary of the transformer, a low voltage will be produced in the secondary of the transformer and a low charging current will flow through the battery.

When the resistance 38 is in series with the transformer winding, the switch arm 23 engages the contact 22 and the automatic lockout switch 24, 25 is by-passed so that even if a break occurs in the control circuit the automatic lockout switch will not prevent automatic reclosing of this circuit. Under these circumstances the charge will be continued to be passed through the battery by re-closing the control circuit at the point where the break occurred. In view of the fact, however, that the thermostat cannot operate even if placed in the battery, which is not the case when using the slow charge because the lowered rate of charge cannot raise the temperature of the battery to the operation point of the thermostat which is generally 120 to 130° F., there is no need of the automatic lockout switch. Furthermore, in the event of a short circuit occurring between the charging clips, only about 20 to 25 amperes will pass through the secondary circuit and under these conditions the overload relay will not operate, and again there is no need for the automatic lockout device.

When the control switch is moved to a position whereby the resistance 38 is cut out of series with the primary winding of the transformer and the switch arm 23 is brought into engagement with contact 28, the automatic lockout will again come into operation and the battery can be safety charged at the high rate.

Figure 4:
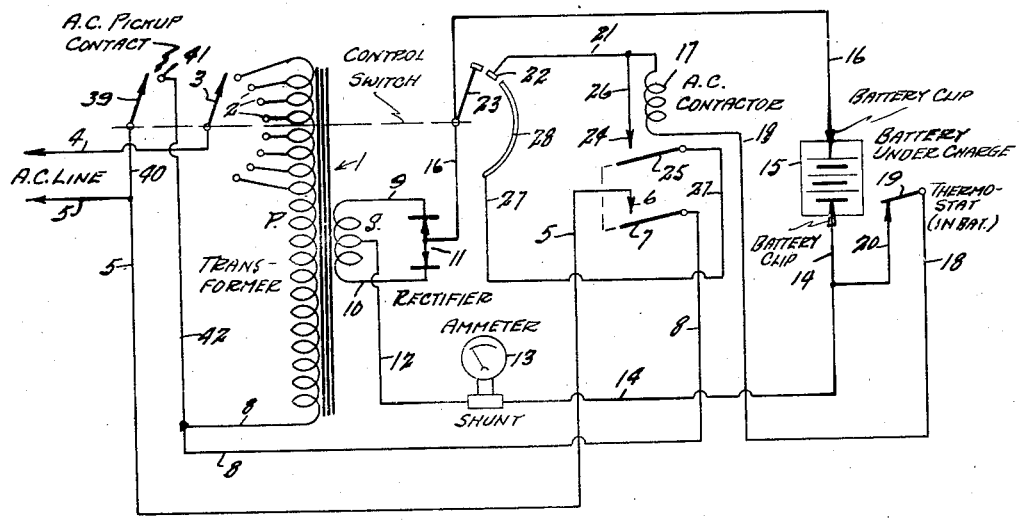
Figure 4 is another view similar to that shown in Figure 1 in which means are provided to enable a dead battery to be charged.
Figure 5:
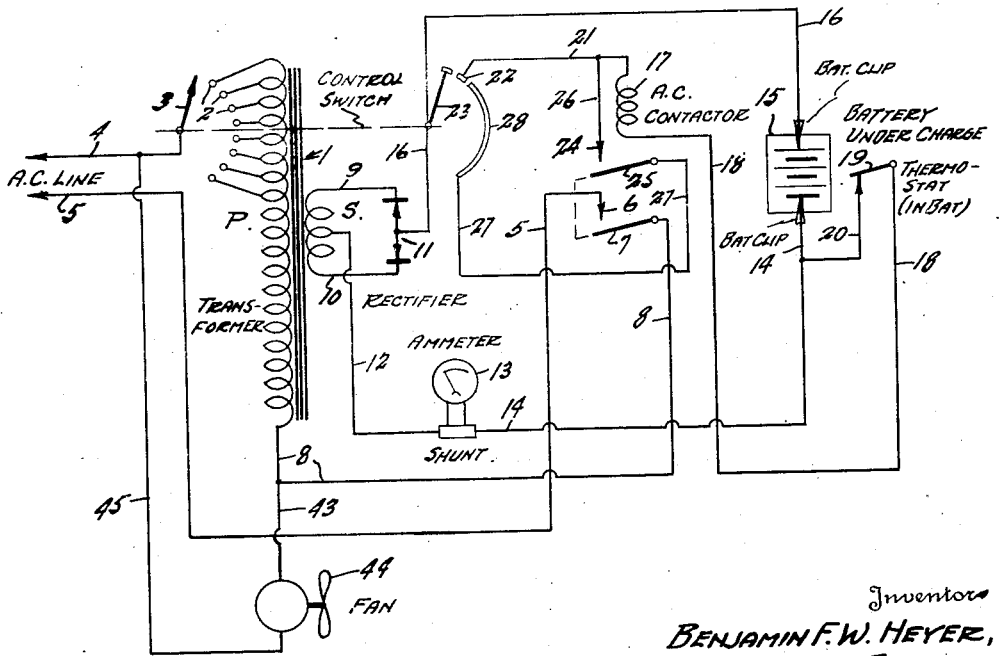
Figure 5 is still another view similar to that illustrated in Figure 1 of the drawings and including means for cooling the rectifier so that the efficiency thereof will be increased.

In the circuits described and illustrated in Figures 1 to 3 of the drawings, it is necessary for the battery to be charged to have some energy therein in order to energize the control circuit and to move the A. C. contactor 6, 7 to a closed position. In some instances, however, the battery will be discharged to such an extent that it will be incapable of energizing the control circuit sufficiently to actuate the A. C. contactor to close the charging circuit. Under these conditions, the present invention provides means for directly connecting the end of the winding of the primary of the transformer, which is normally closed by the A. C. contactor 6, 7, directly to the A. C. line. For this purpose, as illustrated in Figure 4 of the drawings, the circuit is provided with an A. C. pickup contact which comprises a movable contact 39 which is connected by a conductor 40 to conductor 5 and a fixed contact 41 which is connected by a conductor 42 to conductor 8. With this arrangement when the charger is used with a dead battery having insufficient energy to actuate the A. C. contactor, the A. C. pickup contact is closed, and after the charger is started there will be a sufficient amount of energy across the terminals of the battery to sufficiently energize the control circuit to move the A. C. contactor to closed position. The A. C. pickup contact is used only in starting and once the charger has been started it is opened by moving the control switch from starting to any one of its normal operating positions.

It is also within the concept of the present invention to so cool the rectifier as to obtain the maximum efficiency from the same. For this purpose a fan is provided for circulating air over the rectifier. As illustrated, the fan 44 is driven by a motor which is connnected by one lead 45 directly to conductor 4 of the A. C. line and by another lead 43 to the conductor 8 which is connected to the A. C. line 5 by the A. C. contactor 6, 7. By this connection of the fan with the A. C. line, said fan will be placed in operation upon starting of the charger and after the charger has been shut off, the fan will likewise be stopped. This fan may be connected otherwise than as illustrated, but the connection shown has the advantage of stopping the fan when the A. C. contactor 6, 7 is open.

From the foregoing description, it will be appreciated that the present invention provides a novel control circuit and control mechanisms for use with fast chargers so that the fast charging apparatus may be utilized at its maximum efficiency.

I claim:

1. A battery charger comprising a transformer having primary and secondary windings, means including a contactor for connecting the primary winding to a supply circuit, a rectifier, a secondary circuit for connecting said secondary winding in series with the rectifier and a battery to be charged, an actuator for said contactor having a winding, a thermostatically actuated switch responsive to the temperature of the battery, a second contactor operable by said actuator, and means including a control switch having a plurality of contacts so connected as to complete a series circuit through said thermostat switch, contactor actuator and battery when the control switch engages one contact and to complete a series holding circuit through said thermostatic switch, contactor actuator, battery and second contactor when the control switch engages another contact.

2. A battery charger comprising a transformer having primary and secondary windings, means including a contactor for connecting the primary winding to a supply circuit, a rectifier, a secondary circuit for connecting said secondary winding in series with the rectifier and a battery to be charged, an actuator for said contactor having a winding, a thermostatically actuated switch responsive to the temperature of the battery, means independent of the contactor for connecting said thermostatic switch and contactor actuator winding in series with the battery in a normally closed circuit, and manually actuated means for making and breaking the connection of said actuator winding to the battery.

3. A battery charger comprising a transformer having primary and secondary windings, means including a contactor for connecting the primary winding to a supply circuit, a rectifier, a secondary circuit for connecting said secondary winding in series with the rectifier and a battery to be charged, contactor closing means energized by tme battery to be charged to close and maintain said contactor closed, and means responsive to rise of temperature of the battery beyond a determined value to de-energize said contactor closing means and enable said contactor to open.

4. A battery charger comprising a transformer having primary and secondary windings, means including a contactor for connecting the primary winding to a supply circuit, a rectifier, a secondary circuit for connecting said secondary winding in series with the rectifier and a battery to be charged, contactor closing means energized by the battery to be charged to close and maintain said contactor closed, means responsive to rise of temperature of the battery beyond a determined value to de-energize said contactor closing means and enable said contactor to open, and lock-out means to prevent automatic reclosing of the contactor upon reduction of temperature of the battery.

5. A battery charger comprising a transformer having primary and secondary windings, means including a contactor for connecting the primary winuding to a supply circuit, a rectifier, a secondary circuit for connecting said secondary winding in series with the rectifier and a battery to be charged, an actuator for said contactor having a winding, a thermostatically actuated switch responsive to the temperature of the battery, a control switch, a control circuit serially connecting said control switch, said winding and said thermostatically actuated switch across the battery, said control switch being closed by said actuator and opening upon cessation of current flow through the control circuit, and means for by-passing the control switch to complete the control circuit when the control switch is open to energize said winding from the battery.

6. A battery charger comprising a transformer having primary and secondary windings, means including a contactor for connecting the primary winding to a supply circuit, a rectifier, a secondary circuit for connecting said secondary winding in series with the rectifier and a battery to be charged, an actuator for said contactor having a winding, a thermostatically actuated switch responsive to the temperature of the battery, a control switch, a control circuit serially connecting said control switch, said winding and said thermostatically actuated switch across the battery, said control switch being closed by said actuator and opening upon cessation of current flow through the control circuit, means for by-passing the control switch to complete the control circuit when the control switch is open and a selector switch in said control circuit operable in one position to complete the control circuit through the by-pass means and operable in another position to complete the control circuit through the control switch.

7. A battery charger comprising a transformer having primary and secondary windings, means including a contactor for connecting the primary winding to a supply circuit, a rectifier, a secondary circuit for connecting said secondary winding in series with the rectifier and a battery to be charged, an actuator for said contactor having a winding, a control circuit including the actuator winding and the battery to be charged to cause the battery to energize the winding to close and maintain said actuator closed, an overload relay having contacts in said control circuit and a winding in said secondary circuit for opening the contacts and said control circuit upon current of a predetermined value flowing in the secondary circuit and means responsive to rise of temperature of the battery beyond a predetermined value to interrupt said control circuit.

8. A battery charger comprising a transformer having primary and secondary windings, means including a contactor for connecting the primary winding to a supply circuit, a rectifier, a secondary circuit for connecting said secondary winding in series with the rectifier and a battery to be charged, an actuator for said contactor having a winding, a control circuit including the actuator winding and the battery to be charged to cause the battery to energize the winding to close and maintain said actuator closed, a thermostatically actuated switch included in said control circuit and responsive to the battery temperature for opening and closing said circuit, and means for indicating whether the thermostatically actuated switch is closed or open.

9. A battery charger comprising a transformer having primary and secondary windings, means including a contactor for connecting the primary winding to a supply circuit, a rectifier, a secondary circuit for connecting said secondary winding in series with the rectifier and a battery to be charged, an actuator for said contactor having a winding, a control circuit including the actuator winding and the battery to be charged to cause the battery to energize the winding to close and maintain said actuator closed, a thermostatically actuated switch included in said control circuit and responsive to the battery temperature for opening and closing said circuit, and electrical signalling means connected to said battery through said thermostatically actuated switch for indicating whether the thermostatically actuated switch is closed or open.

10. A battery charger comprising a transformer having primary and secondary windings, means including a contactor for connecting the primary winding to a supply circuit, a rectifier, a secondary circuit for connecting said secondary winding in series with the rectifier and a battery to be charged, an actuator for said contactor having a winding connected across the battery to be charged and energized thereby, for closing and maintaining the contactor closed, and means manually operable for connecting the primary winding to said supply circuit independently of the contactor when the battery is dead.

11. A battery charger comprising a transformer having primary and secondary windings, means including a contactor for connecting the primary winding to a supply circuit, a rectifier, a secondary circuit for connecting said secondary winding in series with the rectifier and a battery to be charged, an actuator for said contactor having a winding connected across the battery to be charged and energized thereby, a resistance in series with the primary winding of said transformer, said primary winding having a plurality of taps, a resistance connected in series with the first tap of said winding and having a tap on its free end and a selector switch cooperating with all of said taps.

BENJAMIN F. W. HEYER.
JOHN W. HORTON.
CLARENCE W. DALZELL.